US009772832B2

(12) United States Patent
Rubio

(10) Patent No.: US 9,772,832 B2
(45) Date of Patent: Sep. 26, 2017

(54) COMPUTING SYSTEM WITH SUPPORT FOR ECOSYSTEM MECHANISM AND METHOD OF OPERATION THEREOF

(71) Applicant: S-PRINTING SOLUTION CO., LTD., Suwon-si, Gyeonggi-do (KR)

(72) Inventor: Ramon Rubio, Rossmoor, CA (US)

(73) Assignee: S-PRINTING SOLUTION CO., LTD., Suwon-si (KR)

( * ) Notice: Subject to any disclaimer, the term of this patent is extended or adjusted under 35 U.S.C. 154(b) by 18 days.

(21) Appl. No.: 13/746,270

(22) Filed: Jan. 21, 2013

(65) Prior Publication Data
US 2013/0191822 A1 Jul. 25, 2013

Related U.S. Application Data

(60) Provisional application No. 61/589,097, filed on Jan. 20, 2012.

(51) Int. Cl.
G06F 9/445 (2006.01)
(52) U.S. Cl.
CPC .................... *G06F 8/61* (2013.01)
(58) Field of Classification Search
USPC ........................................................ 717/177
See application file for complete search history.

(56) References Cited

U.S. PATENT DOCUMENTS

| 5,553,290 | A | 9/1996 | Calvert et al. | |
|---|---|---|---|---|
| 6,675,382 | B1 | 1/2004 | Foster | |
| 6,976,253 | B1* | 12/2005 | Wierman | G06F 8/61 |
| | | | | 717/177 |
| 7,624,393 | B2* | 11/2009 | Egan | G06F 8/65 |
| | | | | 717/169 |
| 7,827,549 | B2* | 11/2010 | Tarassov | 717/174 |
| 7,954,098 | B1* | 5/2011 | Martin | G06F 8/61 |
| | | | | 717/176 |
| 2002/0174422 | A1* | 11/2002 | Kelley et al. | 717/178 |
| 2003/0145317 | A1* | 7/2003 | Chamberlain | G06F 8/61 |
| | | | | 717/177 |
| 2003/0233648 | A1* | 12/2003 | Earl et al. | 717/176 |
| 2004/0034853 | A1* | 2/2004 | Gibbons | G06F 8/61 |
| | | | | 717/174 |
| 2005/0216559 | A1* | 9/2005 | Manion et al. | 709/205 |
| 2007/0143379 | A1* | 6/2007 | i Dalfo et al. | 707/205 |
| 2008/0127170 | A1* | 5/2008 | Goldman et al. | 717/174 |
| 2008/0127171 | A1 | 5/2008 | Tarassov | |

(Continued)

OTHER PUBLICATIONS

HP. "HP Notebook PCs—Software Installation Stops Because of the Screen Resolution Requirements." HP Customer Support. N.p., Apr. 1, 2009. Web. Jan. 6, 2016. <http://support.hp.com/us-en/document/c01668614>.*

(Continued)

Primary Examiner — Wei Zhen
Assistant Examiner — Binh Luu
(74) Attorney, Agent, or Firm — Staas & Halsey LLP

(57) ABSTRACT

A method of operation of a computing system includes: receiving an application package for operating on a first device and a second device; parsing the application package for an ecosystem, a first application, and a second application; installing the first application for operating with the first device; and installing the second application for operating on the second device and with the first application.

16 Claims, 6 Drawing Sheets

(56) References Cited

U.S. PATENT DOCUMENTS

| | | | |
|---|---|---|---|
| 2009/0094598 A1* | 4/2009 | Asai ............................. | 717/176 |
| 2009/0119660 A1* | 5/2009 | Redpath ....................... | 717/175 |
| 2010/0281475 A1* | 11/2010 | Jain et al. .................... | 717/172 |
| 2011/0029965 A1* | 2/2011 | Lamba et al. ................ | 717/172 |
| 2011/0209142 A1* | 8/2011 | Wookey ....................... | 717/175 |
| 2012/0036552 A1* | 2/2012 | Dare .................. | H04L 41/0253 |
| | | | 726/1 |
| 2013/0047150 A1* | 2/2013 | Malasky et al. ............. | 717/176 |
| 2013/0138718 A1* | 5/2013 | Mallur ..................... | G06F 8/61 |
| | | | 709/203 |
| 2013/0138783 A1* | 5/2013 | Mallur ..................... | G06F 8/65 |
| | | | 709/221 |
| 2013/0139139 A1* | 5/2013 | Mallur ..................... | G06F 8/65 |
| | | | 717/170 |
| 2013/0139183 A1* | 5/2013 | Mallur ..................... | G06F 8/63 |
| | | | 719/321 |

OTHER PUBLICATIONS

Android. "Supporting Multiple Screens." Android Developers. N.p., n.d. Web. Jan. 6, 2016. <https://web.archive.org/web/20091011120659/http://developer.android.com/guide/practices/screens_support.html>.*

* cited by examiner

COMPUTING SYSTEM WITH SUPPORT FOR ECOSYSTEM MECHANISM AND METHOD OF OPERATION THEREOF

CROSS-REFERENCE TO RELATED APPLICATION(S)

This application claims the benefit of U.S. Provisional Patent Application Ser. No. 61/589,097 filed Jan. 20, 2012, and the subject matter thereof is incorporated herein by reference thereto.

TECHNICAL FIELD

An embodiment of the present invention relates generally to a computing system, and more particularly to a system for support for ecosystem.

BACKGROUND

Our world is becoming more connected. Consumer and industrial electronics, such as music players, digital camera, cellular phones, smartphones, tablets, notebooks, printers, and multifunction devices, provide an ever-increasing levels of functionality to support our connected life including the means for users to create, transfer, store, and consume information almost anywhere, anytime.

In addition, the devices themselves are more connected to one another. The devices operate collaboratively but inter-device connectivity and operation presents other problems and obstacles. Research and development in the existing technologies can take a myriad of different directions.

Thus, a need still remains for a computing system with support for ecosystem mechanism to interconnect devices and to update these devices. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a method of operation of a computing system including: receiving an application package for operating on a first device and a second device; parsing the application package for an ecosystem, a first application, and a second application; installing the first application for operating with the first device; and installing the second application for operating on the second device and with the first application.

An embodiment of the present invention provides a method of operation of a computing system including: receiving an application package for operating on a first device and a second device; parsing the application package for an ecosystem, a first application, a second application, and an associated application identification for the first application with the second application; installing the first application for operating with the first device; and installing the second application for operating on the second device and with the first application.

An embodiment of the present invention provides a computing system, including: a communication unit configured to receive an application package for operating on a first device and a second device; a control unit, coupled to the communication unit, configured to: parse the application package for an ecosystem having a first application and a second application; install the first application for operating with the first device; and install the second application for operating on the second device and with the first application.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
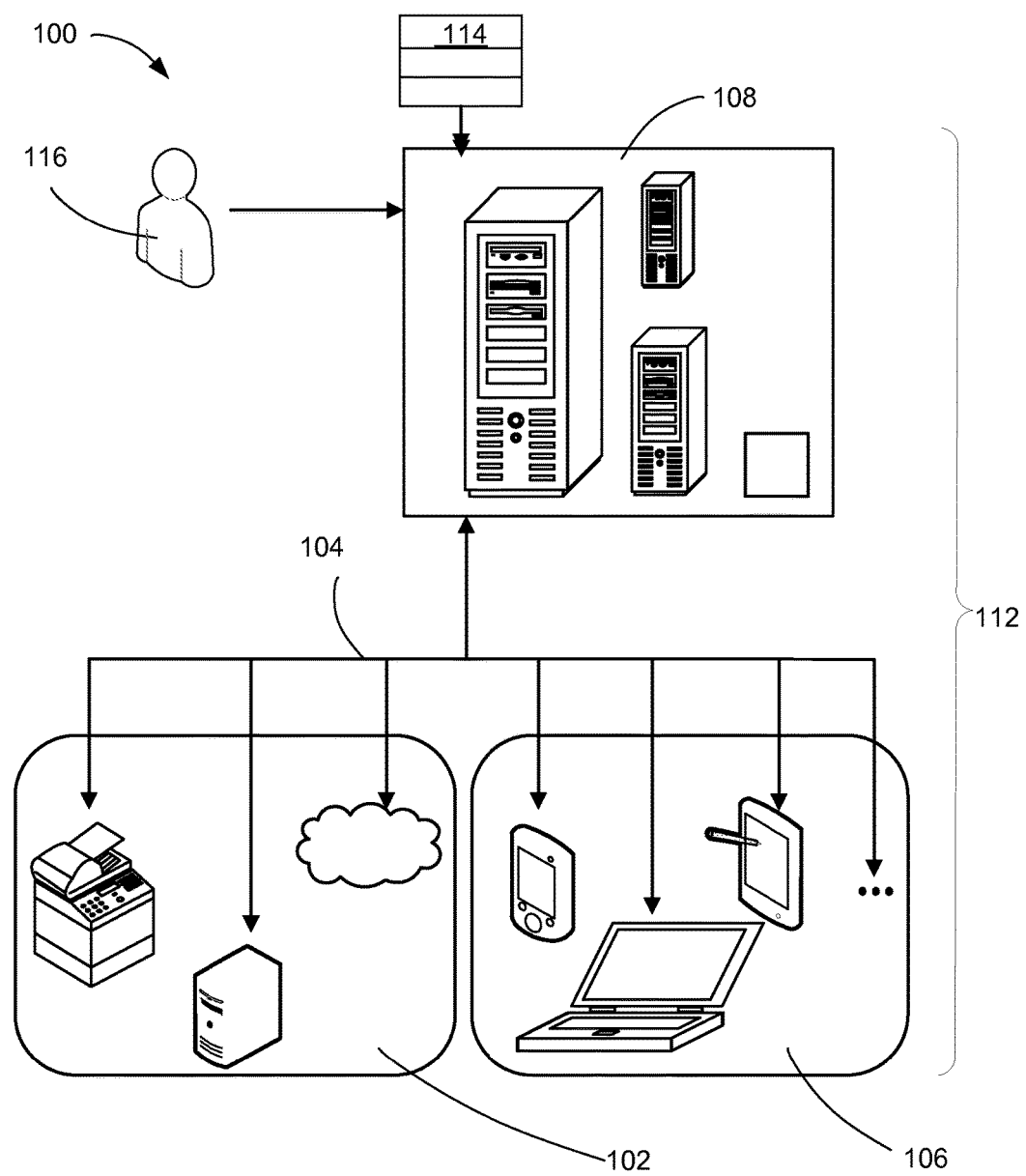
FIG. 1 is a computing system with support for ecosystem mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. Where elements in the embodiments have been numbered first, second, etc., the ordinal order is as a matter of descriptive convenience and are not intended to have any other significance or provide limitations for an embodiment of the present invention.

The term "module" referred to herein can include software, hardware, or a combination thereof in an embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a computing system 100 with support for ecosystem mechanism in an embodiment of the present invention. The computing system 100 includes a first device 102, such as a client device or a server, connected to a second device 106, such as a client device or server, and a content device 108.

The content device 108 can communicate with the first device 102, the second device 106, or a combination thereof with a communication path 104, such as a wireless or wired network. The first device 102 can also communicate with the second device 106 with the communication path 104. The content device 108 can provide content repository service 110.

The computing system 100 can provide an ecosystem 112 for the first device 102, the second device 106, the content device 108, or a combination thereof. An ecosystem 112 is a set of products, businesses, or a combination thereof functioning together. The ecosystem 112 can include a common technological platform for these products, businesses, or a combination thereof. The ecosystem 112 provides a common development environment for developers to create solutions for the ecosystem 112 not necessarily for a particular product. The ecosystem 112 can include a set of products and these products are depicted as the first device 102 and the second device 106, as examples. As an example, these products can differ in the resource capabilities of the hardware platform they are running on but share the same goals and applications from a software perspective.

An application package 114 is an application that is structured to operate with the ecosystem 112. For example, the application package 114 is structured to run on any device that is part of the ecosystem 112. The details of the application package 114 will be described more in FIG. 3.

The content device 108 can couple, either directly or indirectly, to the communication path 104 to communicate with the first device 102, the second device 106, or a combination thereof or can be a stand-alone device. The first device 102 can couple, directly or indirectly, to the communication path 104 to communicate with the second device 106 or can couple to the second device 106.

FIG. 1 depicts an administrator 116. The administrator 116 can administer the computing system 100 or the ecosystem 112 as a managed domain. The administrator 116 can also represent a manage print service (MPS) provider.

For illustrative purposes, the computing system 100 is depicted with the first device 102 as a multifunction device, a desktop computer, and a cloud based computing system, although it is understood that the first device 102 can be different types of devices. For example, the first device 102 can also be a mobile device as well as a stationary device.

Also for illustrative purposes, the computing system 100 is depicted with the second device 106 as a computer tablet, a smartphone, and a notebook computer, although it is understood that the second device 106 can be different type of devices. For example, the second device 106 can also be stationary devices as well as mobile devices.

Further for illustrative purposes, the computing system 100 is described as the first device 102 and the second device 106 being part of the ecosystem 112, although it is understood that the computing system 100 can provide the ecosystem 112 in different configurations. For example, the first device 102, the second device 106, or a combination thereof can be outside or not part of the ecosystem 112. Also for example, some of the devices as depicted as the first device 102 and the second device 106 can be part of the ecosystem 112 while others are not part of the ecosystem 112.

The content device 108 can be any of a variety of centralized or decentralized computing devices. For example, the content device 108 can be a server, a storage system, or a combination thereof in a central location or distributed across different locations, such as different rooms in a building or at different geographic locations. The content device 108 can also include grid-computing resources, a virtualized computer resource, cloud computing resource, routers, switches, peer-to-peer distributed computing devices, or a combination thereof. The content device 108 can be embedded within a telecommunications network.

For illustrative purposes, the computing system 100 is shown with the first device 102, the second device 106, and the content device 108 as end points of the communication path 104, although it is understood that the computing system 100 can have a different partition between the first device 102, the second device 106, the content device 108, and the communication path 104. For example, the first device 102, the second device 106, the content device 108, or a combination thereof can also function as part of the communication path 104.

The communication path 104 can span and represent a variety of network types and network topologies. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104. Further, the communication path 104 can traverse a number of network topologies and distances. For example, the communication path 104 can include direct connection, personal area network (PAN), local area network (LAN), metropolitan area network (MAN), wide area network (WAN), or a combination thereof.

Figure 2:
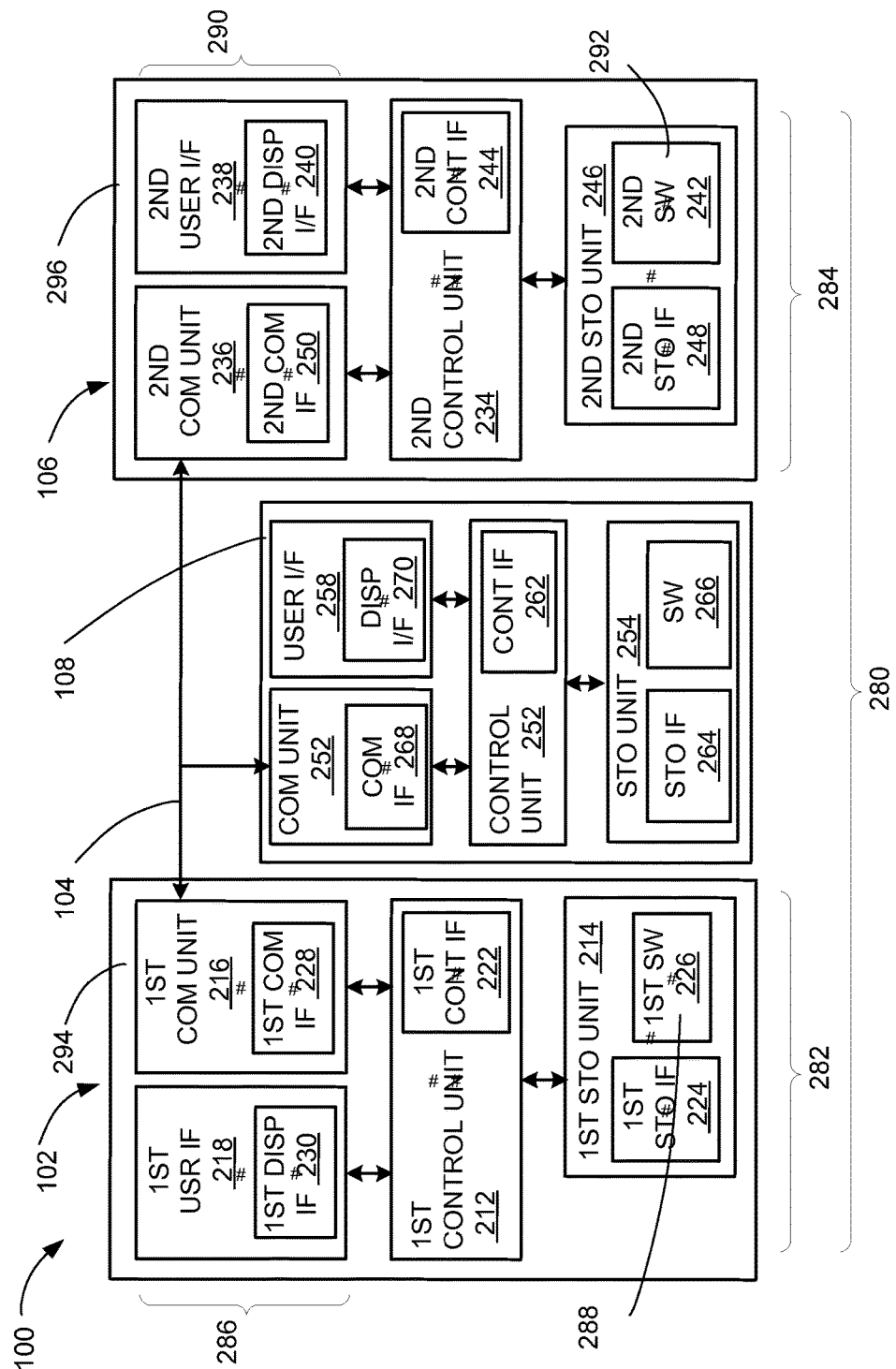
FIG. 2 is an exemplary block diagram of the computing system.

Referring now to FIG. 2, therein is shown an exemplary block diagram of the computing system 100. The computing system 100 can include the first device 102, the communication path 104, the second device 106, and the content device 108. The first device 102 can send information over the communication path 104 to the second device 106. The second device 106 can send information over the communication path 104 to the first device 102.

For illustrative purposes, the computing system 100 is described with the first device 102 as stationary devices, although it is understood that the computing system 100 can have the first device 102 as a different type of device. For example, the first device 102 can be a mobile device.

Also for illustrative purposes, the computing system 100 is described with the second device 106 as a mobile device, although it is understood that the computing system 100 can have the second device 106 as a different type of device. For example, the second device 106 can be a stationary device.

For brevity of description in this embodiment of the present invention, the first device 102 will be described as a stationery device and the second device 106 will be described as a mobile device. The embodiment of the present invention is not limited to this selection for the type of devices. The selection is an example of an embodiment of the present invention.

The first device 102 can include a first control unit 212, a first storage unit 214, a first communication unit 216, and a first user interface 218. The first control unit 212 can include a first control interface 222. The first control unit 212 can execute a first software 226 to provide the intelligence of the computing system 100.

The first control unit 212 can be implemented in a number of different manners. For example, the first control unit 212 can be a processor, an application specific integrated circuit (ASIC) an embedded processor, a microprocessor, a hardware control logic, a hardware finite state machine (FSM), a digital signal processor (DSP), or a combination thereof. The first control interface 222 can be used for communication between the first control unit 212 and other functional units in the first device 102. The first control interface 222 can also be used for communication that is external to the first device 102.

The first control interface 222 can receive information from the other functional units or from external sources, or can transmit information to the other functional units or to external destinations. The external sources and the external destinations refer to sources and destinations external to the first device 102.

The first control interface 222 can be implemented in different ways and can include different implementations depending on which functional units or external units are being interfaced with the first control interface 222. For example, the first control interface 222 can be implemented with a pressure sensor, an inertial sensor, a microelectromechanical system (MEMS), optical circuitry, waveguides, wireless circuitry, wireline circuitry, or a combination thereof.

The first storage unit 214 can store the first software 226. The first storage unit 214 can also store the relevant information, such as data representing incoming images, data representing previously presented image, sound files, or a combination thereof.

The first storage unit 214 can be a volatile memory, a nonvolatile memory, an internal memory, an external memory, or a combination thereof. For example, the first storage unit 214 can be a nonvolatile storage such as non-volatile random access memory (NVRAM), Flash memory, disk storage, or a volatile storage such as static random access memory (SRAM).

The first storage unit 214 can include a first storage interface 224. The first storage interface 224 can be used for communication between and other functional units in the first device 102. The first storage interface 224 can also be used for communication that is external to the first device 102.

The first storage interface 224 can receive information from the other functional units or from external sources, or can transmit information to the other functional units or to external destinations. The external sources and the external destinations refer to sources and destinations external to the first device 102.

The first storage interface 224 can include different implementations depending on which functional units or external units are being interfaced with the first storage unit 214. The first storage interface 224 can be implemented with technologies and techniques similar to the implementation of the first control interface 222.

The first communication unit 216 can enable external communication to and from the first device 102. For example, the first communication unit 216 can permit the first device 102 to communicate with the second device 106 of FIG. 1, an attachment, such as a peripheral device or a computer desktop, and the communication path 104.

The first communication unit 216 can also function as a communication hub allowing the first device 102 to function as part of the communication path 104 and not limited to be an end point or terminal unit to the communication path 104. The first communication unit 216 can include active and passive components, such as microelectronics or an antenna, for interaction with the communication path 104.

The first communication unit 216 can include a first communication interface 228. The first communication interface 228 can be used for communication between the first communication unit 216 and other functional units in the first device 102. The first communication interface 228 can receive information from the other functional units or can transmit information to the other functional units.

The first communication interface 228 can include different implementations depending on which functional units are being interfaced with the first communication unit 216. The first communication interface 228 can be implemented with technologies and techniques similar to the implementation of the first control interface 222.

The first user interface 218 allows a user (not shown) to interface and interact with the first device 102. The first user interface 218 can include an input device and an output device. Examples of the input device of the first user interface 218 can include a keypad, a touchpad, soft-keys, a keyboard, a microphone, an infrared sensor for receiving remote signals, or any combination thereof to provide data and communication inputs.

The first user interface 218 can include a first display interface 230. The first display interface 230 can include a display, a projector, a video screen, a speaker, or any combination thereof.

The first control unit 212 can operate the first user interface 218 to display information generated by the computing system 100. The first control unit 212 can also execute the first software 226 for the other functions of the computing system 100. The first control unit 212 can further execute the first software 226 for interaction with the communication path 104 via the first communication unit 216.

The second device 106 can be optimized for implementing an embodiment of the present invention in a multiple device embodiment with the first device 102. The second device 106 can provide the additional or higher performance processing power compared to the first device 102. The second device 106 can include a second control unit 234, a second communication unit 236, and a second user interface 238.

The second user interface 238 allows a user (not shown) to interface and interact with the second device 106. The second user interface 238 can include an input device and an output device. Examples of the input device of the second user interface 238 can include a keypad, a touchpad, soft-keys, a keyboard, a microphone, or any combination thereof to provide data and communication inputs. Examples of the output device of the second user interface 238 can include a second display interface 240. The second display interface 240 can include a display, a projector, a video screen, a speaker, or any combination thereof.

The second control unit 234 can execute a second software 242 to provide the intelligence of the second device 106 of the computing system 100. The second software 242 can operate in conjunction with the first software 226. The second control unit 234 can provide additional performance compared to the first control unit 212.

The second control unit 234 can operate the second user interface 238 to display information. The second control unit 234 can also execute the second software 242 for the other functions of the computing system 100, including operating the second communication unit 236 to communicate with the first device 102 over the communication path 104.

The second control unit 234 can be implemented in a number of different manners. For example, the second control unit 234 can be a processor, an embedded processor, a microprocessor, hardware control logic, a hardware finite state machine (FSM), a digital signal processor (DSP), or a combination thereof.

The second control unit 234 can include a second controller interface 244. The second controller interface 244 can be used for communication between the second control unit 234 and other functional units in the second device 106. The second controller interface 244 can also be used for communication that is external to the second device 106.

The second controller interface 244 can receive information from the other functional units or from external sources, or can transmit information to the other functional units or to external destinations. The external sources and the external destinations refer to sources and destinations external to the second device 106.

The second controller interface 244 can be implemented in different ways and can include different implementations depending on which functional units or external units are being interfaced with the second controller interface 244. For example, the second controller interface 244 can be implemented with a pressure sensor, an inertial sensor, a microelectromechanical system (MEMS), optical circuitry, waveguides, wireless circuitry, wireline circuitry, or a combination thereof.

A second storage unit 246 can store the second software 242. The second storage unit 246 can also store the such as data representing incoming images, data representing previously presented image, sound files, or a combination thereof. The second storage unit 246 can be sized to provide the additional storage capacity to supplement the first storage unit 214.

For illustrative purposes, the second storage unit 246 is shown as a single element, although it is understood that the second storage unit 246 can be a distribution of storage elements. Also for illustrative purposes, the computing system 100 is shown with the second storage unit 246 as a single hierarchy storage system, although it is understood that the computing system 100 can have the second storage unit 246 in a different configuration. For example, the second storage unit 246 can be formed with different storage technologies forming a memory hierarchal system including different levels of caching, main memory, rotating media, or off-line storage.

The second storage unit 246 can be a volatile memory, a nonvolatile memory, an internal memory, an external memory, or a combination thereof. For example, the second storage unit 246 can be a nonvolatile storage such as non-volatile random access memory (NVRAM), Flash memory, disk storage, or a volatile storage such as static random access memory (SRAM).

The second storage unit 246 can include a second storage interface 248. The second storage interface 248 can be used for communication between other functional units in the second device 106. The second storage interface 248 can also be used for communication that is external to the second device 106.

The second storage interface 248 can receive information from the other functional units or from external sources, or can transmit information to the other functional units or to external destinations. The external sources and the external destinations refer to sources and destinations external to the second device 106.

The second storage interface 248 can include different implementations depending on which functional units or external units are being interfaced with the second storage unit 246. The second storage interface 248 can be implemented with technologies and techniques similar to the implementation of the second controller interface 244.

The second communication unit 236 can enable external communication to and from the second device 106. For example, the second communication unit 236 can permit the second device 106 to communicate with the first device 102 over the communication path 104.

The second communication unit 236 can also function as a communication hub allowing the second device 106 to function as part of the communication path 104 and not limited to be an end point or terminal unit to the communication path 104. The second communication unit 236 can include active and passive components, such as microelectronics or an antenna, for interaction with the communication path 104.

The second communication unit 236 can include a second communication interface 250. The second communication interface 250 can be used for communication between the second communication unit 236 and other functional units in the second device 106. The second communication interface 250 can receive information from the other functional units or can transmit information to the other functional units.

The second communication interface 250 can include different implementations depending on which functional units are being interfaced with the second communication unit 236. The second communication interface 250 can be implemented with technologies and techniques similar to the implementation of the second controller interface 244.

The first communication unit 216 can couple with the communication path 104 to send information to the second device 106. The second device 106 can receive information in the second communication unit 236 from the communication path 104.

The second communication unit 236 can couple with the communication path 104 to send information to the first device 102. The first device 102 can receive information in the first communication unit 216 from the communication path 104. The computing system 100 can be executed by the first control unit 212, the second control unit 234, or a combination thereof. For illustrative purposes, the second device 106 is shown with the partition having the second user interface 238, the second storage unit 246, the second control unit 234, and the second communication unit 236, although it is understood that the second device 106 can have a different partition. For example, the second software 242 can be partitioned differently such that some or all of its function can be in the second control unit 234 and the second communication unit 236. Also, the second device 106 can include other functional units not shown in FIG. 2 for clarity.

The content device 108 can include a content control unit 252, a content storage unit 254, a content communication unit 256, and a content user interface 258. The content control unit 252 can include a content control interface 262. The content control unit 252 can execute a content software 266 to provide the intelligence of the computing system 100 and provide the content repository service 110.

The content control unit 252 can be implemented in a number of different manners. For example, the content control unit 252 can be a processor, an application specific integrated circuit (ASIC) an embedded processor, a microprocessor, a hardware control logic, a hardware finite state machine (FSM), a digital signal processor (DSP), or a combination thereof. The content control interface 262 can be used for communication between the content control unit 252 and other functional units in the content device 108. The content control interface 262 can also be used for communication that is external to the content device 108.

The content control interface 262 can receive information from the other functional units or from external sources, or can transmit information to the other functional units or to external destinations. The external sources and the external destinations refer to sources and destinations external to the content device 108.

The content control interface 262 can be implemented in different ways and can include different implementations depending on which functional units or external units are being interfaced with the content control interface 262. For example, the content control interface 262 can be implemented with a pressure sensor, an inertial sensor, a microelectromechanical system (MEMS), optical circuitry, waveguides, wireless circuitry, wireline circuitry, or a combination thereof.

The content storage unit 254 can store the content software 266 and the information for the content repository service 110. The content storage unit 254 can also store the relevant information, such as data representing incoming images, data representing previously presented image, sound files, or a combination thereof.

The content storage unit 254 can be a volatile memory, a nonvolatile memory, an internal memory, an external memory, or a combination thereof. For example, the content storage unit 254 can be a nonvolatile storage such as non-volatile random access memory (NVRAM), Flash memory, disk storage, or a volatile storage such as static random access memory (SRAM).

The content storage unit 254 can include a content storage interface 264. The content storage interface 264 can be used for communication between and other functional units in the content device 108. The content storage interface 264 can also be used for communication that is external to the content device 108.

The content storage interface 264 can receive information from the other functional units or from external sources, or can transmit information to the other functional units or to external destinations. The external sources and the external destinations refer to sources and destinations external to the content device 108.

The content storage interface 264 can include different implementations depending on which functional units or external units are being interfaced with the content storage unit 254. The content storage interface 264 can be implemented with technologies and techniques similar to the implementation of the content control interface 262.

The content communication unit 256 can enable external communication to and from the content device 108. For example, the content communication unit 256 can permit the content device 108 to communicate with the first device 102, the second device 106, the communication path 104, or a combination thereof.

The content communication unit 256 can also function as a communication hub allowing the content device 108 to function as part of the communication path 104 and not limited to be an end point or terminal unit to the communication path 104. The content communication unit 256 can include active and passive components, such as microelectronics or an antenna, for interaction with the communication path 104.

The content communication unit 256 can include a content communication interface 268. The content communication interface 268 can be used for communication between the content communication unit 256 and other functional units in the content device 108. The content communication interface 268 can receive information from the other functional units or can transmit information to the other functional units.

The content communication interface 268 can include different implementations depending on which functional units are being interfaced with the content communication unit 256. The content communication interface 268 can be implemented with technologies and techniques similar to the implementation of the content control interface 262.

The content user interface 258 allows a user to interface and interact with the content device 108. The content user interface 258 can include an input device and an output device. Examples of the input device of the content user interface 258 can include a keypad, a touchpad, soft-keys, a keyboard, a microphone, an infrared sensor for receiving remote signals, or any combination thereof to provide data and communication inputs.

The content user interface 258 can include a content display interface 270. The content display interface 270 can include a display, a projector, a video screen, a speaker, or any combination thereof.

The content control unit 252 can operate the content user interface 258 to display information generated by the computing system 100. The content control unit 252 can also execute the content software 266 for the other functions of the computing system 100. The content control unit 252 can further execute the content software 266 for interaction with the communication path 104 via the content communication unit 256.

For illustrative purposes, the computing system 100 is described by operation of the first device 102, the second device 106, and the content device 108. It is understood that the first device 102, the second device 106, and the content device 108 can operate any of the functions of the computing system 100 described herein.

The computing system 100 can include resource constraints 280 for the first device 102, the second device 106, the content device 108, or a combination thereof. The resource constraints 280 are device limitations that the application package 114 would have when running on that device. The resource constraints 280 can apply to a first resource constraint 282 for the first device 102 and to a second resource constraint 284 for the second device 106.

The first resource constraint 282 can include the size or availability of the first storage unit 214, the processing or compute power or bandwidth of the first control unit 212, or the size or resolution of the first display interface 230. As a more specific example, the device limitation of the first display interface 230 can be further termed as a first user interface constraint 286. The first user interface constraint 286 can also include device limitation from the first control unit 212 to render the user interface from a first application 288 running on the first device 102. The first application 288 can be part of the application package 114 or another instance of the application package 114. The term the first application 288 refers to a pointer to the executable files or the executable files themselves.

As a further example, the first device 102 can include as part of the resource constraints 280 is a first product functionality 294. The first product functionality 294 can provide the constraints for the type of functions provided by the first device 102. Examples can be the first device 102 as a stationary device cannot provide functions required in a mobile environment, e.g. derating processor speed for battery operation or dynamically adjusting brightness to accommodate different lighting environments.

The second resource constraint 284 can include the size or availability of the second storage unit 246, the processing or compute power or bandwidth of the second control unit 234, or the size or resolution of the second display interface 240. As a more specific example, the device limitation of the second display interface 240 can be further termed as a second user interface constraint 290. The second user interface constraint 290 can also include device limitation from the second control unit 234 to render the user interface from a second application 292 running on the second device 106. The second application 292 can be part of the application package 114 or another instance of the application package 114. The term the second application 292 refers to a pointer to the executable files or the executable files themselves.

As a further example, the second device 106 can include as part of the resource constraints 280 is a second product functionality 296. The second product functionality 296 can provide the constraints for the type of functions provided by the second device 106. Examples can be the second device 106 as a mobile device cannot provide functions required in a stationary environment, e.g. providing various external port connections or provide numerous hardware expansion options.

For illustrative purposes, the first application 288 and the second application 292 is described as operating on the first device 102 and the second device 106, respectively, although it is understand that the operation of the first application 288 and the second application 292 can be performed with different configurations. For example, the first application 288 can also operate with or on the second device 106. The second application 292 can also operate with or on the second device 106. Also as an example, the first application 288 or a portion of the first application 288 can operate with or on the first device 102, the second device 106, or a combination thereof. The second application 292 or a portion of the second application 292 can operate with or on the first device 102, the second device 106, or a combination thereof. The first application 288 or a portion of the first application 288 can be a pointer or location identification to the executable files for the first application 288 or a portion of the first application 288, as will be described in more details in FIG. 3.

The first application 288 can be part of the first device 102, the second device 106, or a combination thereof implemented in hardware or software. The examples of hardware implementation for the first application 288 are similar to the examples for the first control unit 212. The first application 288 can also be part of the first software 226, the second software 242, or a combination thereof.

The second application 292 can be part of the first device 102, the second device 106, or a combination thereof implemented in hardware or software. The examples of hardware implementation for the second application 292 are similar to the examples for the second control unit 234. The second application 292 can also be part of the first software 226, the second software 242, or a combination thereof. The second application 292 or a portion of the second application 292 can be a pointer or location identification to the executable files for the second application 292 or a portion of the second application 292, as will be described in more details in FIG. 3.

Figure 3:
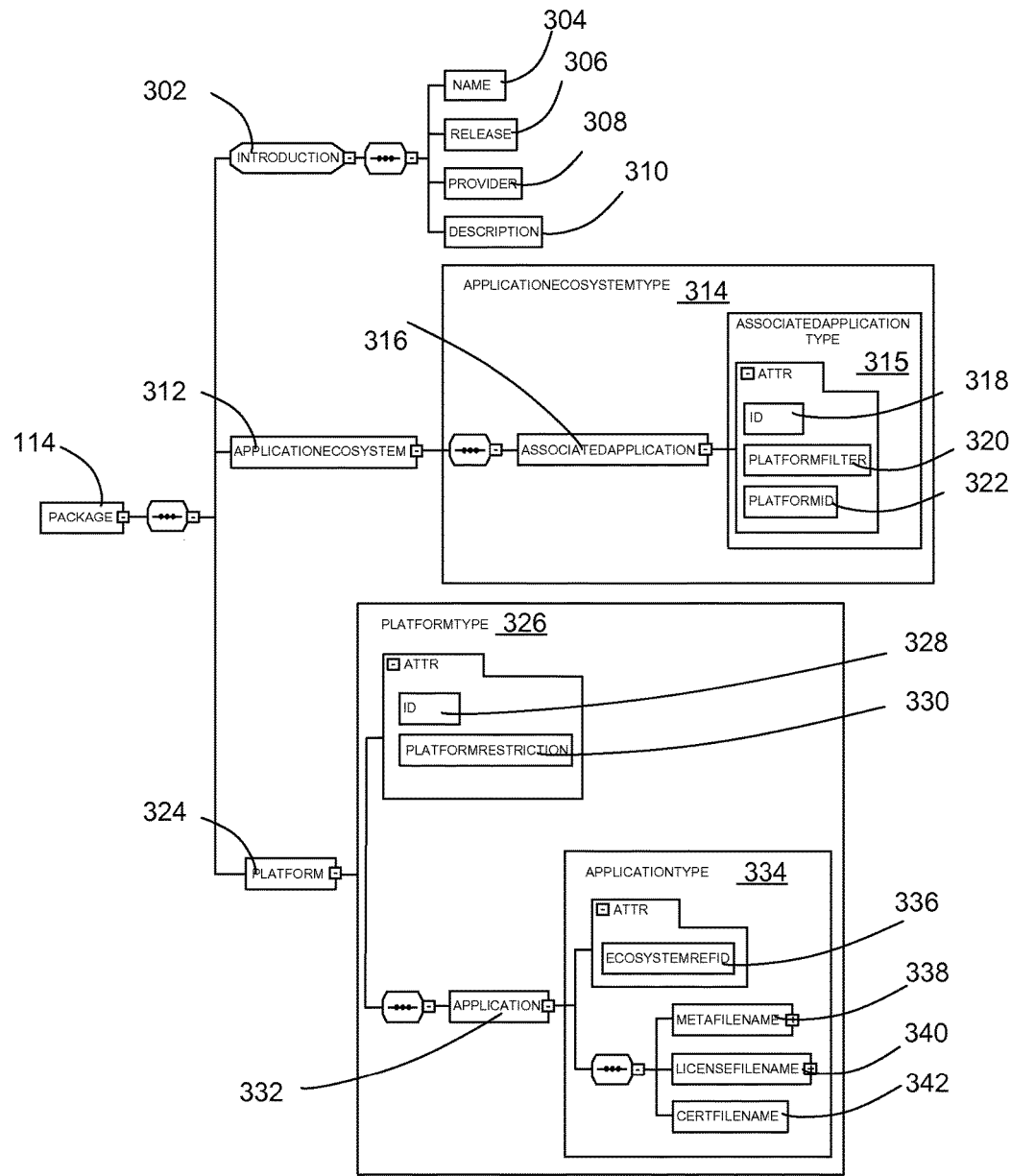
FIG. 3 is an example of an application package for the computing system.

Referring now to FIG. 3, therein is shown an example of the application package 114 for the computing system 100 of FIG. 1. As briefly described in FIG. 1, the application package 114 can be developed with a structure that can apply to some, if not all, the products and solutions that are part of the ecosystem 112 of FIG. 1. The first device 102 of FIG. 1 and the second device 106 of FIG. 1 can be examples of these products. The structure of the application package 114 can allow application developers to provide product specific solutions within the application package 114 to deal with the resource constraints 280 associated with the product.

The structure of the application package 114 can also allow an application developer to associate other solutions that are part of the ecosystem 112 for a particular solution. Examples of associations are Personal Computer Drivers, software running on mobile devices, and televisions.

In order for the application package 114 to support the ecosystem 112 with a multitude of products and platforms with different resource requirements and constraints, the structure of the application package 114 enables application developers and tools for creating package to create a single application package for all products and platforms but still allowing them the flexibility to provide platform specific content within the same package. FIG. 3 depicts an example schema for the structure of the application package 114.

The application package 114 can include an introduction 302, which can provide a name 304 for identifying the application package 114 and a release identification 306, which can provide the release or build information for the application package 114. The introduction 302 can also include a provider identification 308, which can indicate the provider or publisher of the application package 114, and a description 310, which can provide functional description or information notes about the application package 114 or the release of the application package 114.

The application package 114 can also include an application ecosystem information 312 for identifying which of the ecosystem 112, if any, the application package 114 or portions of the application package 114 is a related or associated. The application ecosystem information 312 enables an application developer to associate other applications that enhance the usability and functionality of their application on other systems (mobile devices, television, printers, personal computers, etc.).

For illustrative purposes, the FIG. 3 depicts the application package 114 as a singular example, although it is understood that the computing system 100 can include more than one instance of the application package 114. There can be once application package 114 for the first application 288 and another for the second application 292. The application package 114 can refer to the first application 288, the second application 292, or a combination thereof can be through a pointer, such as a uniform resource indicator (URI). The application package 114 can also include the first application 288, the second application 292, or a combination thereof or a portion thereof of each.

The application ecosystem information 312 can include an application ecosystem type 314. The application ecosystem type 314 provides details of the application ecosystem information 312. The application ecosystem type 314 can represent an xml nomenclature for the application package 114. The application ecosystem type 314 can include associated application information 316. There can be more than one instance of the associated application information 316 in the application package 114. There can be one instance of the associated application information 316 for every application associated or related to the application in the application package 114. Each of the associated application information 316 can be used link to different applications such that the association with each other allows that if a user of an application uses a device (a printer, a television, a mobile device, etc.) that has associated software, that device can be automatically updated to enhance the user experience. The associated application information 316 can be used to link or associate the first application 288 of FIG. 2 with the second application 292 of FIG. 2.

The associated application type 315 provides details for the associated application information 316. The associated application type 315 can represent an xml nomenclature for the application package 114. The associated application type 315 can include an associated application identification 318, a platform filter 320, and a platform target identification 322. Examples of the associated application type 315 are network functions, scan function, facsimile function, print function, or graphic user interface function. The associated application identification 318 provides one or more identification for association for each of the associated applications to one or more ecosystem of which the ecosystem 112 is an example. The associated application identification 318 can merely provide a pointer or location to an application associated with the application in the application package 114 or the application package 114 can actually include the associated application and not just a mere pointer.

The associated application identification 318 can represent the first application 288, the second application 292, or a combination thereof. There can also be more than once instance of the associated application identification 318 where one can represent the first application 288 and another for the second application 292.

The platform filter 320 provide any constraints required by the application on the platform that it is being installed and as examples, the platform can be operating the first device 102 or the second device 106. The platform filter 320 can provide the resource constraints 280, the first user interface constraint 286, the second user interface constraint 290, or a combination thereof.

The platform target identification 322 provides a designation the particular platform(s) where the application can be installed. The platform target identification 322 can be in different forms depending on associated application type 315.

Returning to the description of the application package 114, the application package 114 can also include platform information 324. The platform information 324 provides the details of the platforms where the application package 114 can operate. The platform information 324 can represent information for the first application 288, the second application 292, or a combination thereof. There can be one platform information 324 for the first application 288 and another one for the second application 292.

Each of the platform information 324 includes a platform type 326. The platform type 326 provides details for the platform information 324. The platform type 326 can represent an xml nomenclature for the application package 114. The platform type 326 includes a platform identification 328 for identifying the particular platform. This is used to match with the platform target identification 322. The platform information 324 can also include a platform restriction 330 defining restrictions for when this particular platform entry should be used. The platform restriction 330 can be used to match with the platform filter 320 to allow the application to run.

Each of the platform information 324 can also include application information 332. The application information 332 describes the content of the application. The application information 332 can represent information for the first application 288, the second application 292, or a combination thereof. The application information 332 can include an application type 334. The application type 334 provides details for the application information 332. The application type 334 can represent an xml nomenclature for the application package 114. The application type 334 can include an ecosystem identification 336. The ecosystem identification 336 can be used to match the application ecosystem information 312 in other instances of the application package 114 or the ecosystem identification 336 in other instances of the application package 114.

The application information 332 can also include an application name 338 used to identify the location and the filename of the application as being local or remote to the product or device the application is being installed to run. The application name 338 can be provided in a number of ways. For example, the application name 338 can be described as a metafilename with a uniform resource indicator (URI). The application name 338 can represent the first application 288, the second application 292, or a combination thereof. As with the platform information 324, there can be one application name 338 for the first application 288 and another one for the second application 292.

The application information 332 can include other information such as license information 340 and certificate information 342 if a license or a certificate is required to run on the platform, as an example. The license information 340 can be a file name or pointer to the file for the license. The certificate information 342 can be a file name or a pointer to the file for the certificate.

Utilizing the Tables below as examples with the architectural view from FIG. 1, the administrator 116 can auto push to the user of a given manage domain software as the application package 114 that is associated with an application. The application associated with the ecosystem identification 336 can come from different providers or all from the same provider. The content device 108 of FIG. 1 or the content repository service 110 of FIG. 1 can receive the application package 114 for processing. The content communication unit 256 can be used to receive the application package 114.

The ecosystem 112 can be managed by the administrators at managed domain level and automatically reflected on all devices where software is installed. The first device 102 and the second device 106 are examples of these devices.

The following tables provide an example how the application package 114 can be added to the computing system 100. The administrator 116 can install and manage the CounThru package as the application package 114 at the manage domain level. The CounThru package can define the ecosystem 112 for which it is associated. The ecosystem 112 for the CounThru package is automatically managed based on settings at the manage domain level and to the content repository service 110, the content device 108, and the content storage unit 254 of FIG. 2.

The ecosystem 112 can be managed by the administrator 116 at managed domain level and automatically reflected on all devices where software is installed. The first device 102 and the second device 106 are examples of these devices. These tables below can provide information parsed by the content repository service 110 in the content device 108 from the application package 114. The parsing function can be done by the content control unit 252.

Table 1 below provides the information that describes where an application can be installed and a reference to the ecosystem, if any. Table 1 depicts an example of the platform information 324 from the application package 114.

| platformID | applicationID | ecosystemID | platformFilter | appDescriptorID |
|---|---|---|---|---|
| XOA-E | CounThru | CounThruEcosystem | ((minLocalUiSize=10in)&&(platformVersion=1.0.0,*)) | 1 |
| iOS | iOSCounThru | | (platformVersion=5.*.*,*) | 2 |
| Android | AndroidCounThru | | (platformVersion=2.3.*,3.*.*) | 3 |

The first column of Table 1 represents the platform identification 328. The first column depicts examples of the platform identification as extensible open architecture (XOA-TM), iOS (operating system from Apple), and Android (TM—operating system from Google). As an example, the platform identification 328 can represent the operating system requirement for the application to run for the particular product.

The second column of Table 1 can represent the application information 332, the application type 334, or the information from the application name 338 with the URI. The second column depicts examples of applications as CounThru™, iOSCounThru, and AndriodCounThru.

The third column of Table 1 can represent the ecosystem identification 336. For the first cell in this column, this particular platform and application is related to the ecosystem 112 with the ecosystem identification 336 of CounThruEcosystem. The other cells in the third column are empty indicating the iOSCounThru, and AndriodCounThru are not related to any ecosystem.

The fourth column of Table 1 represents the platform restriction 330. The top cell in this column provides the user interface constraint for the first user interface constraint 286, the second user interface constraint 290, or a combination thereof to have a minimum local user interface size of 10 inches and the version of the platform identification 328 to be a version as specified in this cell. The other two cells in this column specify the version of the platform identification 328, respectively.

The fifth column of Table 1 represents the application information 332 or the information in the application type 334. The information in these cells represents the application identification and can represent the first application 288, the second application 292, or a combination thereof.

Table 2 below provides the information of the ecosystem 112 that describes the other applications that are part of the application ecosystem. Table 2 depicts an example of the application ecosystem information 312 from the application package 114.

| ecoSystemID | asscoiatedApplicationID | platformID | platformFilter |
|---|---|---|---|
| CounThruEcoSystem | AndroidCounThru | Android | (platformVersion-2.3.*,3.*.*) |
| CounThruEcoSystem | iOSCounThru | iOS | (platformVersion5.*.*,*) |

The first column of Table 2 represents information for the application ecosystem type 314. Both cells in this column indicate that an association to the CounThruEcoSystem.

The second column of Table 2 represents information for the associated application identification 318. The top cell indicates the associated application identification 318 is AndroidCounThru and the bottom cell is iOSCounThru.

The third column of Table 2 represents information for the platform target identification 322. The top cell in this column indicates the platform target identification 322 is for Android and the bottom cell is for iOS.

The fourth column of Table 2 represents information for the platform restriction 330. Each cell provides a restriction for the version of the platform.

Table 3 below provides an example of a makeup of the application or what files makeup the application. Table 3 below provides the information that is part of the platform information 324. Table 3 depicts an example of the application type 334 from the application package 114.

| appDescriptorID | Content |
|---|---|
| 1 | Bundle1.jar |
| 1 | Bundle2.jar |
| 1 | Bundle3.jar |
| 2 | CounThru.ios |
| 3 | CounThru.apk |

The first column of Table 3 coincides with the fifth column of Table 1. The second column of Table 3 represents the contents associated with the corresponding identification in column 1 of Table 3.

Figure 4:
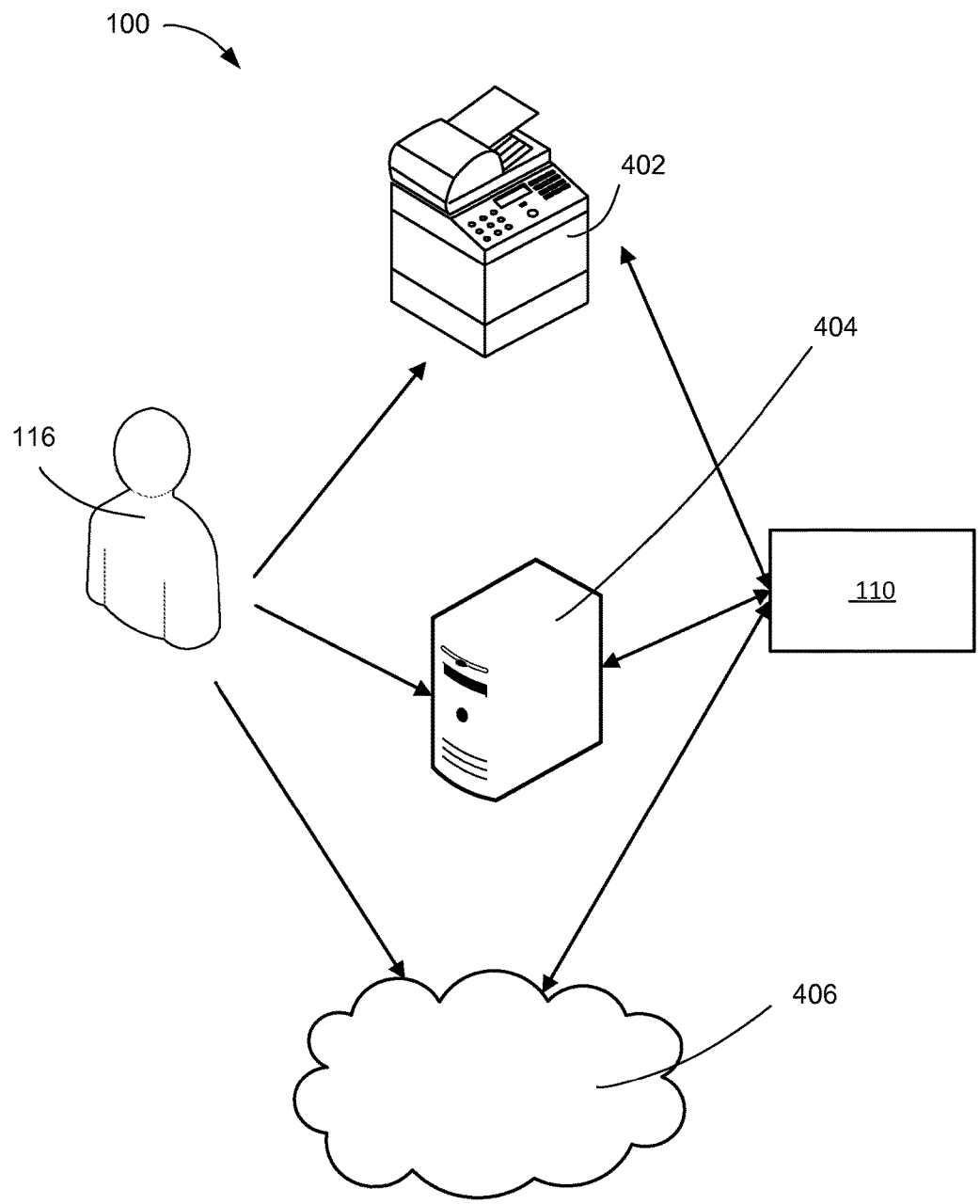
FIG. 4 is an example architecture view of the computing system for distribution.

Referring now to FIG. 4, therein is shown an example architecture view of the computing system 100 for distribution. FIG. 4 depicts the administrator 116. FIG. 4 depicts the computing system 100 including embedded multifunctional devices 402, a host platform 404, and a host cloud platform 406. In this example, the embedded multifunctional devices 402 represent XOA-E devices.

Once an application via the application package 114 of FIG. 3 has been added to the content repository service 110 with the content device 108 and the content storage unit 254 of FIG. 2, the computing system 100 can distribute the application.

As examples, there are two forms of distribution for installation, manual push and automated distribution. For manual push distribution, the application is distributed to systems or the first device 102 of FIG. 1 or the second device 106 of FIG. 1 that running XOA platform, using the example from the Tables in FIG. 3. The XOA devices request install files for a given application and provide the platform identification 328, device meta data such as resource constraints 280. The content repository service 110 returns installable files for the given application and platform. Examples of these installable files can be the first application 288 and the second application 292, both of which can be from the application package 114. This process of distribution is part of the installation process by the content repository service 110, the content device 108, or a combination thereof.

Automated pull distribution enables creation of an automated management system for all devices associated with a given manage domain (or Service level agreement). For the automated pull distribution, a device agent is installed on the devices where the software is to be deployed. As an example, the device agent would need to be installed on the first device 102 of FIG. 1, the second device 106 of FIG. 1, or a combination thereof for those devices to perform the automated pull of the application.

For XOA platforms, this agent will be present but for other devices (mobile, tablets, televisions, etc.) as depicted as the second device 106 in FIG. 1 where the agent shall need to be installed. The automated pull distribution of the application can also be performed on non-XOA systems as long as the device agent is installed on those devices.

For the automated pull distribution, the administrator 116 queries the content repository service 110 for correct content based on parameters passed by the device agent. The device agent periodically pools a manage domain application manager service, which can be running on the content device 108, for applications on the device based on which managed domain, or the ecosystem 112, the device belongs to.

It has been discovered that the computing system 100 provides the application package 114 with a structure such that a single application package for all products/solutions in the ecosystem 112 regardless of the resource constraints 280 of the first device 102 or the second device 106. The application package 114 provides the ability to provide product specific functionality within same package. The structure of the application package 114 allows application developer to define intended/supported products of the ecosystem 112. The structure of the application package 114 enables the ecosystem 112 to provide custom user interface based on product accessing the ecosystem 112 and meta-data definitions defined in the application package 114. The structure of the application package 114 enables application to provide default configuration settings for their application and enables ecosystem to provide application configuration tool for application configuration prior to deployment. The structure of the application package 114 enables different creation of an "application ecosystem" where different applications may be associated with each other so that if a user of an application uses a device (printer, television, mobile device, etc. . . . ) that has associated software it is automatically updated to enhance the user experience. The structure of the application package 114 provides the ability to provide "smart" services based on metadata defined by. This is particularly useful in auto updates where the client automatically receives the correct content based on its identification. The structure of the application package 114 provides for the ability to provide user interface that filters applications based on products/platforms and other constraints.

It has been discovered that the computing system 100 provides a single package structure with the application package 114 for all products in the ecosystem 112, enables product specific functionality within same package, supports application configuration prior to and after deployment, and allows developers to define intended/supported products in the ecosystem 112. This is of great value as it provides the following benefits to developers, end users, and the ecosystem 112. For developers, the application package 114 reduces complexity of managing their solution as a single package/application may be used for all products that are part of the ecosystem 112 and provides a mechanism of associating other solutions that are part of the solution ecosystem and enhance the usability and functionality of the solution. For end Users or customers, the application package 114 provides common feature set across products that are part of the ecosystem 112, a single common package format for all products, and ease of use as users of solution may have their devices (printers, mobile devices, pc, television, etc. . . . ) automatically updated with software that participate in solution ecosystem. From a perspective of the ecosystem 112, the application package 114 simplifies application management functionality as it reduces the number of applications and versions that need to be managed by ecosystem, simplifies tool creation as only one package structure needs to be supported, enables smart user interface that filter packages based on client, and enables auto updates for users of solution and all devices that may participate in solution.

The functions described in this specification can be hardware implementation or hardware accelerators in the first control unit 212 of FIG. 2 or in the second control unit 234 of FIG. 2. The functions can also be hardware implementation or hardware accelerators within the first device 102 or the second device 106 but outside of the first control unit 212 or the second control unit 234, respectively.

Figure 5:
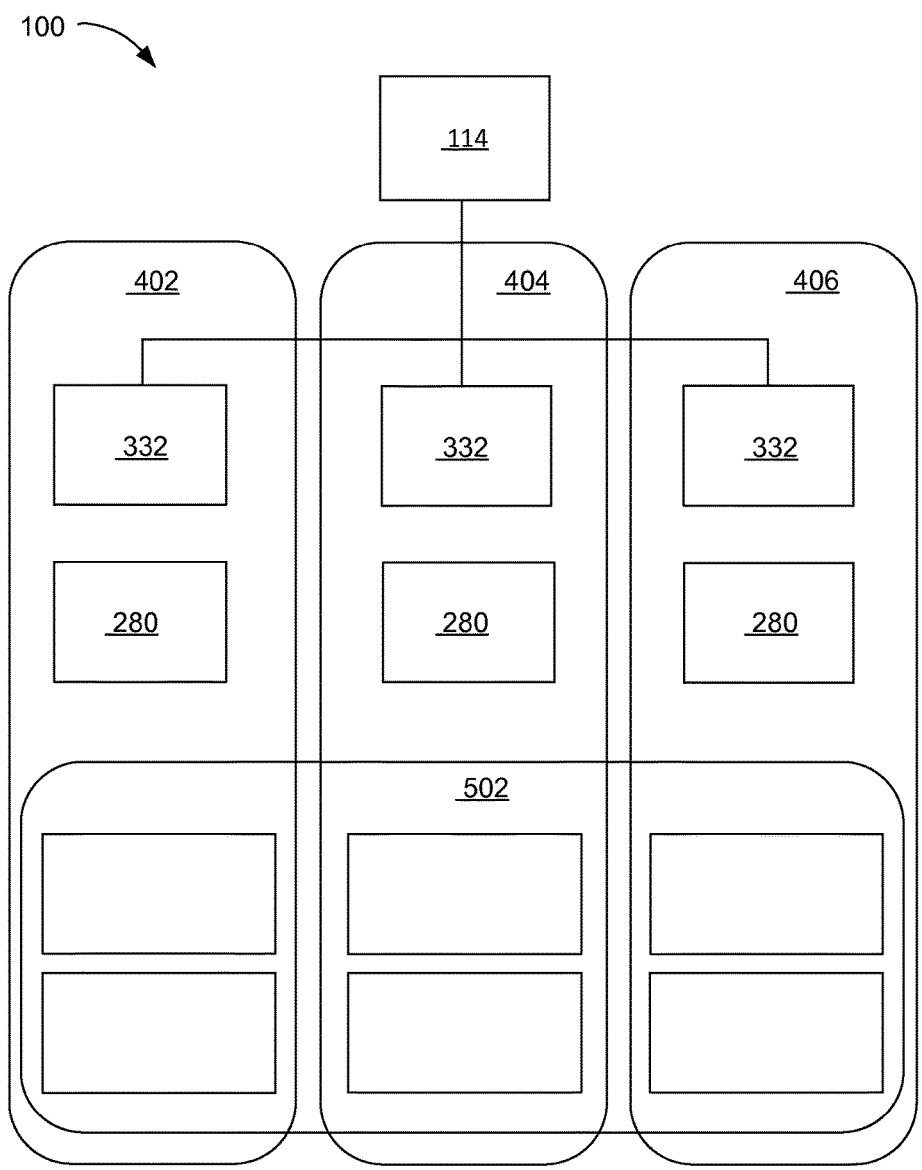
FIG. 5 is an example partition of the application package in the computing system.

Referring now to FIG. 5, therein is shown an example partition of the application package 114 in the computing system 100. As an example, FIG. 5 depicts the CounThru application (used as an example from FIG. 3 from the application information 332) includes of common functions 502, or "common" set of binaries, that are installed for all platforms, but that it separates the user interface related binaries so that it maximizes usage of the constraints of the user interface related to a given product or platform.

The following product and platform constraints can lead to an application providing product functionality or as a more specific example, product/platform specific functionality: the user interface constraints, the resource constraints 280 (memory, speed, etc.), and application programming interface (API) constraints.

For illustrative purposes, the computing system 100 describes product/platform constraints, although it is understood that the application package 114 can accommodate other types of constraints. For example, additional resources within an Application definition can be shared or unique based on a constraint. Some of these resources are, for example, binaries, scripts, images, fonts, and license.

Figure 6:
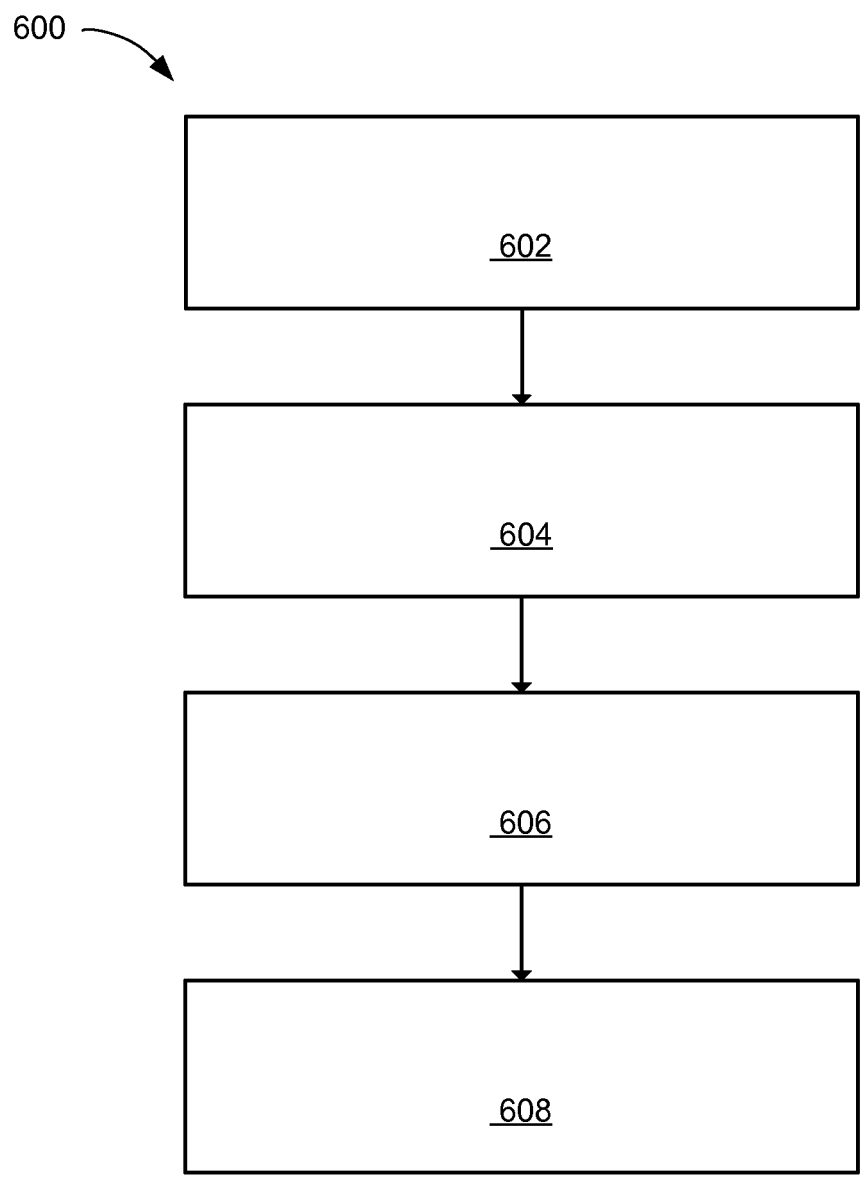
FIG. 6 is a flow chart of a method of operation of a computing system in an embodiment of the present invention.

Referring now to FIG. 6, therein is shown a flow chart of a method 600 of operation of a computing system 100 in an embodiment of the present invention. The method 600 includes: receiving an application package for operating on a first device and a second device in a block 602; parsing the application package for an ecosystem, a first application, and a second application in a block 604; installing the first application for operating with the first device in a block 606; and installing the second application for operating on the second device and with the first application for displaying on a device in a block 608.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A method of operation of a computing system, comprising:
   receiving an application ecosystem information identifying an ecosystem to which an application package is related, the application ecosystem information including an associated application information for linking a first application operating on a first device and a second application operating on a second device, such that automatic updating of the second application operating on the second device can be performed when updating of the first application operating on the first device is performed, the second application having a provider different from the first application and the first device and the second device being different types of devices, the associated application information including:
      a platform filter for designating constraints required by the first application, the second application, or a combination thereof on a platform to be installed with the first application, the second application, or a combination thereof, the platform filter including a version of the platform that is required for the application package to be installed in the platform, and
      a platform target identification for identifying a platform where the first application, the second application, or a combination thereof can be installed;
   providing a platform information for designating a platform where the first application, the second application, or a combination thereof can be installed, the platform information including:
      a platform identification for identifying the platform,
      a platform restriction for defining restrictions for when the platform should be used, and
      an application information to describe a content of the first application, the second application, or a combination thereof, the application information including an ecosystem identification;
   associating the first application with the first device and associating the second application with the second device in the ecosystem, by matching the application ecosystem information from the application ecosystem information with the ecosystem identification included in the application information, matching the platform filter from the application ecosystem information with the platform restriction included in the platform information, and matching the platform target identification from the application ecosystem information with the platform identification included in the platform information;
   creating the application package including the application ecosystem information and the platform information based on the associating, for updating the second application when the first application is updated or vice versa; and
   transmitting the application package to the first device thereby providing an update to the first application operating on the first device based on the application package and thereby automatically providing an update to the second application operating on the second device when updating of the first application operating on the first device is performed.

2. The method as claimed in claim 1 further comprising providing a provider identification for indicating the provider.

3. The method as claimed in claim 1 further comprising providing a custom interface for allowing the different types of the devices to access an ecosystem.

4. The method as claimed in claim 1 further comprising providing a single package structure for the application package for implementing the application packages in the different types of the devices.

5. The method as claimed in claim 1, wherein the platform filter further includes information on a user interface constraint for enabling a user interface for the different types of the devices.

6. The method as claimed in claim 1 wherein the version of the platform corresponds to a version of an operating system of the platform where the application package can be installed.

7. The method as claimed in claim 1, wherein the application information further includes license information, certification information, or a combination thereof for running the application package on the platform.

8. The method as claimed in claim 1, wherein the platform filter further includes information on a resource constraint for limiting the application package from running on the first device, the second device, or a combination thereof.

9. A computing system, comprising:
   a controller configured to:
      receive an application ecosystem information identifying an ecosystem to which an application package is related, the application ecosystem information including an associated application information for linking a first application operating on a first device and a second application operating on a second device, such that automatic updating of the second application operating on the second device can be performed when updating of the first application operating on the first device is performed, the second application having a provider different from the first application and the first device and the second device being different types of devices, the associated application information including:
         a platform filter for designating constraints required by the first application, the second application, or a combination thereof on a platform to be installed with the first application, the second application, or a combination thereof, the platform filter including a version of the platform that is required for the application package to be installed in the platform, and
         a platform target identification for identifying a platform where the first application, the second application, or a combination thereof can be installed,
      provide a platform information for designating a platform where the first application, the second application, or a combination thereof can be installed, the platform information including:
  a platform identification for identifying the platform,
  a platform restriction for defining restrictions for when the platform should be used, and
  an application information to describe a content of the first application, the second application, or a combination thereof, the application information including an ecosystem identification,
associate the first application with the first device and associate the second application with the second device in the ecosystem, by matching the application ecosystem information from the application ecosystem information with the ecosystem identification included in the application information, matching the platform filter from the application ecosystem information with the platform restriction included in the platform information, and matching the platform target identification from the application ecosystem information with the platform identification included in the platform information, and
create the application package including the application ecosystem information and the platform information based on the association of the first application with the first device and the association of the second application with the second device; and
a transmitter-receiver, coupled to the controller, to transmit the application package to the first device thereby providing an update to the first application operating on the first device based on the application package and thereby automatically providing an update to the second application operating on the second device when updating of the first application operating on the first device is performed.

10. The system as claimed in claim 9 wherein the controller is configured to provide a provider identification for indicating the provider.

11. The system as claimed in claim 9 wherein the controller is configured to provide a custom interface for allowing the different types of the devices to access an ecosystem.

12. The system as claimed in claim 9 wherein the controller is configured to provide a single package structure for the application package for implementing the application packages in the different types of the devices.

13. The system as claimed in claim 9, wherein the platform filter further includes information on a user interface constraint for enabling a user interface for the different types of the devices.

14. The system as claimed in claim 9 wherein the version of the platform corresponds to a version of an operating system of the platform where the application package can be installed.

15. The system as claimed in claim 9, wherein the application information further includes license information, certification information, or a combination thereof for running the application package on the platform.

16. The system as claimed in claim 9, wherein the platform filter further includes information on a resource constraint for limiting the application package from running on the first device, the second device, or a combination thereof.

* * * * *